United States Patent Office 3,808,315
Patented Apr. 30, 1974

3,808,315
METHODS AND BENZAMIDE COMPOSITIONS FOR PRODUCING CNS DEPRESSANT AND HYPOTENSIVE ACTIVITY
William D. Roll, 6112 Douglas Road,
Toledo, Ohio 43613
No Drawing. Continuation-in-part of application Ser. No. 180,206, Sept. 13, 1971, now abandoned, which is a division of application Ser. No. 822,029, May 5, 1969, now Patent No. 3,660,461. This application Feb. 28, 1973, Ser. No. 336,415
Int. Cl. A61k 27/00
U.S. Cl. 424—304                17 Claims

ABSTRACT OF THE DISCLOSURE

Simultaneously acting central nervous system (CNS) depressant and/or hypotensive pharmaceutical compositions comprising effective amounts of compounds of the formula:

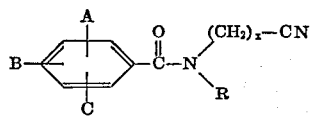

wherein A, B, and C are selected from the group consisting of hydrogen, lower alkyl, lower alkoxy, and halogen radicals at least one of which is an alkoxy or a halogen radical; wherein x is a whole number from one to three, and wherein R is selected from the group consisting of cycloaliphatic radicals containing between three and seven carbon atoms, together with carriers therefor, and the methods for administering said compounds.

RELATED APPLICATION

This application is a continuation-in-part of William D. Roll copending application Ser. No. 180,206 filed Sept. 13, 1971, now abandoned, which is a division of application Ser. No., 822,029, filed May 5, 1969, now U.S. Pat. No. 3,660,461, issued May 2, 1972.

BACKGROUND OF THE INVENTION

Although similar N-cyanoalkyl benzamides are known, no similar ones were found which had either, not to mention both, the CNS depressant and hypotensive effects of applicant's compounds. For example; the Crovetti et al. U.S. Pat. No. 3,457,294 patented July 22, 1969 is for antibacterial, antifungal and antiprotozoal activity, the Pursglove U.S. Pat. No. 2,927,126 patented Mar. 1, 1960 is for a biocide, and the Saxon Pat. No. 3,172,869 patented Mar. 9, 1965 is for a plasticizer.

Although similar N-cycloalkyl benzamides are known, they only had biocide or CNS depressant effects, and none had hypotensive activity.

SUMMARY OF THE INVENTION

This invention comprises pharmaceutical compositions containing various benzamides having novel depressant and hypotensive activity and methods of administering these compositions to small animals to produce these effects.

The compositions of this invention are unit dosage forms, such as tablet, capsule, elixir, sterile solution, suspension, etc., containing a therapeutically effective amount of a benzamide having the general formula:

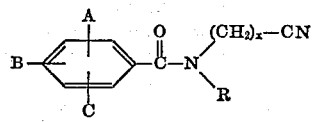

wherein A, B, and C may be mono-, di-, or tri-fluoro-, chloro-, bromo-, iodo-, methoxy, or ethoxy-radicals and may be mono- or di-methyl, or ethyl-radicals, but preferably chloro- or methoxy- radicals substituted in the ortho-, meta-, and para-positions, but preferably in the meta- or para-positions, of the phenyl ring of the benzamide. The cyanoalkyl radical of the benzamide may comprise a cyano- methyl-, ethyl-, or propyl-radical, but preferably the cyanoethyl-radical while the R radical may comprise a tri-, quatra-, penta-, hexa-, or hepta-cycloaliphatic radical, preferably cyclohexyl radical, which together with the halo- or methoxy-radicals on the phenyl ring of the benzamide confers the proper physico-chemical properties on these compounds which are necessary for maximal activity in the animals tested. Although the N-cyanoethyl-radical is preferred, the N-cyanopropyl-radical also is good, but the N-cyanomethyl is less effective, and those N-cyanoalkyl radicals of four or more carbon atoms produce no significant depressant action in any practical dosages.

These benzamides were prepared by the modification of the Schotten-Baumann Reaction according to the following equation:

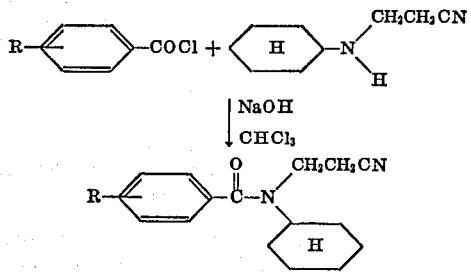

Herein an acyl halide was reacted with an N-(2-cyanoalkyl)-cycloalkylamine in the presence of sodium hydroxide and chloroform at room temperature and agitated until the exothermic reaction was complete. The chloroform layer was then washed with water, dried with anhydrous sodium sulfate and evaporated in a vacuum to produce a viscous yellow oil which crystallized on standing for a period of several weeks. This crude product was then recrystallized from aqueous ethanol to give the pure new compounds of this invention, which were tested for composition and physical properties. The results of some of these tests on the preferred N-cyclohexyl-N-cyanoethyl-methoxy- and chlorobenzamides are shown in the following Table I:

TABLE I

| Example number | Phenyl ring substituted radical | Percent Yield by above process | Melting point (° C.) | Ultraviolet data | | Infrared absorption | | Calculated (percent) | | Analyzed (percent) | |
|---|---|---|---|---|---|---|---|---|---|---|---|
| | | | | | | C=O | CN | C | H | C | H |
| 1 | p-CH₃O— | 76.8 | 77–78 | 282 | 1,679 | 1,630 | 2,265 | 71.30 | 7.74 | 71.33 | 7.78 |
| 2 | m-CH₃O— | 75.0 | | 282 | 2,040 | 1,630 | 2,265 | 71.30 | 7.74 | 71.77 | 7.83 |
| 3 | o-CH₃O— | 74.5 | 43–44 | 282 | 2,611 | 1,630 | 2,265 | 71.30 | 7.74 | 71.45 | 7.80 |
| 4 | p-Cl— | 79.4 | 93–94 | 266 | 1,500 | 1,630 | 2,265 | 66.08 | 6.58 | 66.20 | 6.50 |
| 5 | m-Cl— | 75.0 | 48–49 | 266 | 757 | 1,630 | 2,265 | 66.08 | 6.58 | 66.12 | 6.63 |
| 6 | o-Cl— | 78.4 | 56–57 | 266 | 391 | 1,630 | 2,265 | 66.08 | 6.58 | 66.14 | 6.60 |

The activity of these benzamide compounds was tested by dissolving them in propylene glycol and parenterally injecting the resulting solutions into small animals such as rats and mice in dosages of two and of four milligrams per kilogram of weight of the animal injected. The depressant or stimulatory effects of the new compounds were determined in mice with actophotometers which measure the total movements of a single animal each thirty minute interval over a two hour period, and the mean count for each period for twelve animals for each compound was recorded. The direct blood pressure measurements for these new compounds were conducted in eight Wistar rats for each compound, which rats were under urethan anesthesia, 1.2 g./kg. i.p., with a mercury monometer connected to the carotid artery. The solutions of these new compounds were injected via the femoral vein. Indirect blood pressure measurements were conducted in normotensive Wistar rats using a photoelectric tensometer.

The results of these pharmacological tests for the new compounds listed in Table I above are shown in the following two Tables II and III for 4 mg./kg. and 2 mg./kg. doses, respectively, the latter or smaller doses having no significant effect on the blood pressure:

TABLE II

[At dosage 4 mg./kg. in mice]

| Compound of Example number | Relative depressant action on central nervous system (CNS) | Relative hypotensive action |
| --- | --- | --- |
| 1 | ++++++ | ++++++ |
| 2 | ++++ | +++++ |
| 3 | ++ | ++ |
| 4 | +++++ | ++++ |
| 5 | +++ | +++ |
| 6 | + | + |

TABLE III

[At dosage 2 mg./kg. in mice]

| Compound of Example No. | Relative stimulation of central nervous system (CNS) |
| --- | --- |
| 1 | ++++++. |
| 2 | ++++. |
| 3 | (Depressant). |
| 4 | +++++. |
| 5 | (Stimulation then depression). |
| 6 | (Depressant). |

The pharmaceutical compositions of this invention are composed of these benzamides incorporated in a non-toxic liquid or solid pharmaceutical carrier or excipient. Thus, simple propylene glycol solutions of the active ingredients have been found suitable, however, the active ingredients may be incorporated in pharmaceutical carrier forms, such as tablets or capsules, which may contain other non-toxic materials such as fillers or diluents, namely: lactose or sucrose, and may contain a binding agent such as glucose, gum acacia, gelatin, starch paste, etc. Furthermore, they may contain lubricants, such as magnesium stearate, talc, etc., as well as such disintegrating agents as corn starch, microcrystalline cellulose, etc. The active ingredients may also be incorporated into injectable solutions which may contain other non-toxic materials including: solvents, such as propylene glycol, water for injection, etc., and preservatives, such as benzyl alcohol, etc.

The unit dosage forms are prepared by standard formulation methods such as by granulating and tableting, by mixing with a carrier and filling into hard gelatin capsules; by dissolving or suspending in a suitable sterile parenteral vehicle; or by dissolving in an aqueous vehicle for an oral liquid dosage form.

The unit dosage forms will contain a sufficient amount of active ingredient to provide effective central nervous system depressant and/or hypotensive activity with correspondingly minimal toxic side effects.

A unit dose range of from approximately 10–150 mg. provides depressant and/or hypotensive activity with minimal side reactions. Such unit doses are administered 1–4 times daily. For calculating the amounts of active ingredients in the claimed unit dosage forms, it is often convenient to use milligrams of the active compounds per kilogram of the weight of the animal to which they are administered, depending on the activity of the active ingredient together with the size and pharmacology of the host animal. In such claimed unit dosages, the active compound will be present in approximately 0.5–10 mg./ kg. but preferably 1–5 mg./kg. amounts.

The following examples are designed to explain the methods of preparation and administration of the compounds of this invention, but it is to be understood that they are not to limit the scope of this invention:

Example 1

N - cyclohexyl-N-cyanoethyl-p-methoxybenzamide was prepared by shaking a mixture of 15 milliliters of chloroform, 0.01 mole of N-(2-cyanoethyl) cyclohexylamine, 60 milliliters of 5% sodium hydroxide, and 0.01 mole of p-chloro-acyl chloride in a separator at room temperature until the exothermic action was complete. The chloroform layer was washed with water, dried with anhydrous sodium sulfate, and evaporated in a vacuum to produce a viscous yellow oil which crystallized on standing for a period of several weeks. These crude crystals were then re-crystallized from aqueous ethanol to form the pure N-cyclohexyl-N-cyanoethyl-p-methoxy-benzamide sample of this example.

This sample was then tested according to the Table I above in which the carbon and hydrogen content or percentages were obtained with a Coleman carbon-hydrogen analyzer. The melting point was determined by using a Mettler FP–1 melting and boiling point apparatus. The infrared absorption spectra were obtained with a Perkin-Elmer Model 137–B spectrophotometer, and the ultraviolet data were obtained with a Bausch and Lomb Spectronic 600 Spectrophotometer.

The oral administration of four milligrams per kilogram of this Example 1 compound dissolved in propylene glycol resulted in a significant reduction in the spontaneous motor activity of the mice and rats as well as causing a simultaneous drop in blood pressure (see Table II above). Ataxia was clearly discernible in the animal at elevated dosages such as for example ten milligrams per kilogram, and a rat responded even more dramatically to such elevated dosages, by assuming a cataleptoid posture. Slightly lower dosages on the other hand, say of two milligrams per kilogram of this new Example 1 compound, produced excitation in mice (see Table III above), and rather effectively antagonized the tranquilizing activity of orally simultaneously administered 0.4 milligram doses of perphenazine. This new compound also produced a significant hypotensive effect when administered intraperitoneally to unanesthetized normotensive rats.

Example 2

N-cyclohexyl-N-cyanoethyl-m-methoxybenzamide was prepared from m-methoxy acyl chloride and N-2(2-cyanoethyl) cyclohexylamine in the same manner as that employed in Example 1 above, except that it was purified by chromatography on silica gel and eluted with petroleum ether, instead of being re-crystallized for its purification. The resulting compound was also tested as described in Example 1 above, and as shown in Tables I, II, and III above, to act in doses of 4 mg./kg. both as a CNS depressant and a blood pressure depressor.

Example 3

N - cyclohexyl-N-cyanoethyl-o-methoxybenzamide also was produced in the manner described in Example 1 above and similarly tested as described therein and as shown in the above Tables I, II, and III, and was shown to have both CNS depressant and blood pressure depressor activity in dosages of 4 mg./kg.

Example 4

N-cyclohexyl-N-cyanoethyl-p-chlorobenzamide was also produced according to the process described for Example 1 above and similarly tested as shown in Table I.

Oral doses of this compound of two milligrams per kilogram in propylene glycol produced a high degree of excitation but its antagonism to 0.4 milligram per kilogram doses of perphenazine was insignificant. Although depression was the predominant symptom of animals receiving doses of four milligrams per kilogram of this new compound of Example 4, the degree of reduction in spontaneous motor activity was less than that for the compound of Example 1. It also was a blood pressure depressor as shown in Table II above.

Example 5

N-cyclohexyl - N - cyanoethyl-m-chlorobenzamide was also produced similar to the process described in Example 1, and it had pharmacological effects similar to those for the compound of Example 2 as shown in Table II. However, in smaller dosages, as shown in Table III, it caused excitation during the first hour of measurement, but the spontaneous activity of mice receiving this reduced dosage rapidly decreased during the next one and a half hour period.

Example 6

N-cyclohexyl-N-cyanoethyl-o-chlorobenzamide was produced according to the process described for Example 1 and was tested to have properties and an activity slightly less than the compound of Example 3.

Example 7

TABLET FORMULATION

| | Gm./tablet |
|---|---|
| Active ingredient | 0.025 |
| Lactose | 0.150 |
| Sucrose | 0.025 |
| Corn starch | 0.015 |
| Stearic acid | 0.003 |

These ingredients are granulated and compressed by standard pharmaceutical methods.

Example 8

CAPSULE FORMULATION

| | Gm./capsule |
|---|---|
| Active ingredient | 0.025 |
| Magnesium stearate | 0.002 |
| Lactose, qs ad | 0.300 |

These ingredients are screened, mixed and filled into hard gelatine capsules.

Example 9

ORAL ELIXIR FORMULATION

| | Mg. |
|---|---|
| Active ingredient | 400 |
| Aromatic elixir, USP, to make 1000 cc. | |

Example 10

PARENTERAL FORMULATION

| | Percent |
|---|---|
| Active ingredient | 0.040 |
| Propylene glycol | 60.00 |
| Benzyl alcohol | 2.00 |
| Water for injection, USP, qs ad 100.00%. | |

While there is described above the principles of this invention in connection with specific products, it is to be clearly understood that this description is made only by way of example and not as a limitation to the scope of this invention.

I claim:

1. A method of producing central nervous system depressant activity in an animal needing such treatment comprising administering internally to said host animal a non-toxic but effective quantity of a compound of the formula:

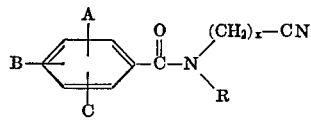

wherein A, B and C are selected from the group consisting of hydrogen, lower alkyl, lower alkoxy, and halogen, at least one of which is alkoxy or halogen, wherein $x$ is a whole number from one to three, and wherein R is cycloalkyl containing between three and seven carbon atoms.

2. A method according to claim 1 wherein A is hydrogen and B and C are located in the meta- and para-positions.
3. A method according to claim 1 wherein $x$ is 2.
4. A method according to claim 1 wherein R is cyclohexyl.
5. A method according to claim 1 wherein A is halogen and B and C are hydrogen.
6. A method according to claim 1 wherein A is methoxy and B and C are hydrogen.
7. A method according to claim 1 wherein said compound is N-cyclohexyl - N - cyanoethyl-p-methoxybenzamide.
8. A method according to claim 1 wherein said compound is N-cyclohexyl - N - cyanoethyl-m-methoxybenzamide.
9. A method according to claim 1 wherein said compound is N-cyclohexyl-N-cyanoethyl-p-chlorobenzamide.
10. A method according to claim 1 wherein the quantity of said compound administered is between about 0.5 and 10 milligrams per kilogram of the host animal.
11. A method according to claim 1 wherein the quantity of said compound administered is between about 1 and 5 milligrams per kilogram of the host animal.
12. A method according to claim 1 wherein said compound together with a pharmaceutically acceptable carrier is administered in a unit dose composition in the form of a capsule, tablet, elixir or parenteral formulation.
13. A central nervous system depressant pharmaceutical composition comprising between about 10 and 150 milligrams of a compound of the formula:

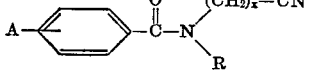

wherein A is selected from the group consisting of para and meta methoxy and ethoxy, wherein $x$ is a whole number from one to three, and wherein R is selected from the group consisting of cyclopropyl, cyclobutyl, cyclopentyl, cyclohexyl and cycloheptyl together with a pharmaceutically acceptable carrier.

14. A composition according to claim 13 wherein $x$ is 2.
15. A composition according to claim 13 wherein R is cyclohexyl.
16. A composition according to claim 13 wherein said compound is N-cyclohexyl-N-cyanoethyl-p-methoxybenzamide.
17. A composition according to claim 13 wherein said compound is N-cyclohexyl-N-cyanoethyl-m-methoxybenzamide.

References Cited

UNITED STATES PATENTS

| 2,927,126 | 3/1960 | Pursglove | 260—465 D |
| 3,457,294 | 7/1969 | Crovetti et al. | 260—465 D |
| 3,172,869 | 3/1965 | Saxon | 260—465 D |

ALBERT T. MEYERS, Primary Examiner

N. A. DREZIN, Assistant Examiner